(12) United States Patent
Wixey et al.

(10) Patent No.: US 7,458,402 B2
(45) Date of Patent: Dec. 2, 2008

(54) PORTABLE POWER PLANER

(75) Inventors: Barry Wixey, Sanibel, FL (US); Robert P. Welsh, Hunt Valley, MD (US); David L. Wikle, York, PA (US); Jyh Cherng Lin, Timonium, MD (US); Leo Chang, Darli (TW); Chin Long Chi, Taichung (TW)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/657,934

(22) Filed: Sep. 9, 2003

(65) Prior Publication Data

US 2004/0250882 A1 Dec. 16, 2004

Related U.S. Application Data

(63) Continuation-in-part of application No. 10/428,385, filed on May 2, 2003, now Pat. No. 6,708,744, which is a continuation of application No. 10/124,746, filed on Apr. 17, 2002, now Pat. No. 6,601,621.

(60) Provisional application No. 60/284,486, filed on Apr. 18, 2001, now abandoned.

(51) Int. Cl.
*B27C 1/00* (2006.01)
(52) U.S. Cl. .................. 144/117.1; 144/227
(58) Field of Classification Search ............. 144/114.1, 144/117.1, 121, 129, 130, 369, 371, 373, 144/226–228, 231, 174; 30/475; 409/206, 409/210, 213, 218
See application file for complete search history.

(56) References Cited

U.S. PATENT DOCUMENTS

| 753,528 | A | * | 3/1904 | Stutzman | ..................... 144/221 |
|---|---|---|---|---|---|
| 2,449,201 | A | | 9/1948 | Buss | |
| 2,619,997 | A | | 12/1952 | Gaskell | |
| 2,792,036 | A | * | 5/1957 | Buttke | ..................... 144/114.1 |
| 3,968,712 | A | | 7/1976 | Duncan | |
| 5,375,951 | A | | 12/1994 | Veale | |
| 5,771,949 | A | * | 6/1998 | Welsh et al. | ................. 144/130 |
| 5,829,499 | A | * | 11/1998 | Liao | ........................... 144/130 |
| 5,927,357 | A | * | 7/1999 | Welsh et al. | ................. 144/130 |
| 5,957,173 | A | * | 9/1999 | Garcia | ..................... 144/117.1 |

(Continued)

FOREIGN PATENT DOCUMENTS

DE          3735842       *    5/1989

(Continued)

*Primary Examiner*—Shelley Self
(74) *Attorney, Agent, or Firm*—Michael Aronoff; Adan Ayala

(57) ABSTRACT

A portable power planer for planing the top surface of a workpiece. The portable power planer includes a base assembly, a carriage assembly disposed above the base assembly, the carriage assembly includes a cutterhead assembly, the carriage assembly being vertically movable to change distance between the base assembly and the carriage assembly, a hand crank attached to the carriage assembly for changing the distance between the base assembly and the carriage assembly, a material removal gauge disposed on the carriage assembly, a switch disposed on the carriage assembly, and a height scale disposed on the base assembly, wherein the material removal gauge, the switch and the height scale are on the front side of the power planer, and the hand crank is substantially on the front half of the power planer.

14 Claims, 10 Drawing Sheets

U.S. PATENT DOCUMENTS

| | | | | |
|---|---|---|---|---|
| 5,988,239 A | * | 11/1999 | Chen | 144/129 |
| 6,089,286 A | * | 7/2000 | Liao | 144/117.1 |
| 6,089,287 A | * | 7/2000 | Welsh et al. | 144/130 |
| 6,510,879 B1 | * | 1/2003 | Chuang | 144/130 |
| 2003/0024601 A1 | * | 2/2003 | Garcia et al. | 144/130 |
| 2003/0196725 A1 | * | 10/2003 | Chuang | 144/252.1 |

FOREIGN PATENT DOCUMENTS

| | | |
|---|---|---|
| DE | 299 03 076 U1 | 7/2000 |
| EP | 1252993 | 10/2002 |
| EP | 1502719 | 2/2005 |
| GB | 351 284 A | 6/1931 |

\* cited by examiner

PORTABLE POWER PLANER

CROSS-REFERENCE TO RELATED APPLICATIONS

This application is a continuation-in-part of U.S. patent application Ser. No. 10/428,385, filed on May 2, 2003, now U.S. Pat. No. 6,708,774, which is in turn a continuation of U.S. patent application Ser. No. 10/124,746, filed on Apr. 17, 2002, now U.S. Pat. No. 6,601,621, which in turn claims priority to U.S. Provisional Application Ser. No. 60/284,486, filed on Apr. 18, 2001, now abandoned.

FIELD OF THE INVENTION

The present invention generally relates improvements in portable power tools, and more specifically to improvements that are particularly well suited for use with wood working power tools such as portable power planers.

BACKGROUND OF THE INVENTION

Various power tools are used in woodworking in an effort to efficiently and accurately form workpieces to desired dimensions and with a desired surface finish. As is widely known, planing machines are often used for surface planing of wooden boards. A conventional planing machine typically includes one or more rotatably mounted cutting blades attached to a vertically movable carriage assembly. Also known are jointer machines which are typically used for the edge planing of wood. In certain applications, the functions of conventional planing machines and jointers are combined within a single unit commonly referred to as a jointer/planer machine.

In a typical wood planing machine, such as a surface planer, a selectively adjustable workpiece opening is defined between a carriage assembly and the planing surface of the base of the machine. The rotationally mounted blades are carried on the underside of the carriage assembly adjacent to the workpiece opening. The blades are adapted to remove a predetermined amount of material from the workpiece depending on the thickness of the workpiece and the height of the workpiece opening. The carriage assembly also usually includes one or more feed rollers which urge the workpiece through the workpiece opening during the operation of the wood planing machine.

In most applications, the carriage assembly of a wood planing machine is movably mounted to a plurality of support columns for movement with respect to the planing surface. Such movement of the carriage assembly adjusts the vertical dimension of the workpiece opening so as to selectively determine the amount of material to be removed from the workpiece. Alternatively, the carriage assembly may be fixed and the planing surface adjusted vertically with respect to the carriage assembly so as to adjust the vertical dimension of the workpiece opening.

In use, a workpiece is passed through the workpiece opening and a predetermined amount of material is removed from the surface of the workpiece adjacent the carriage assembly. Multiple passes of the workpiece through the workpiece opening are often necessary to obtain the desired thickness and surface finish. As with other woodworking operations, it is desirable that a planing machine accomplishes preparation with precision, repeatability and a high quality surface finish. In order to accomplish these goals, many of the planing machines of the prior art have relied on designs that utilize rather large and heavy components.

While such designs have proven to be acceptable for relatively large planing machines which are repositioned on a relatively infrequent basis, they have largely been inadequate for portable planing machines, due to their weight. Accordingly, there is a need in the art for a portable planing machine having a highly robust design that permits a workpiece to be prepared with precision, repeatability and a high quality surface finish.

SUMMARY OF THE INVENTION

In one preferred form, the present invention provides a base assembly, a carriage assembly disposed above the base assembly, the carriage assembly includes a cutterhead assembly, the carriage assembly being vertically movable to change distance between the base assembly and the carriage assembly, a hand crank attached to the carriage assembly for changing the distance between the base assembly and the carriage assembly, a material removal gauge disposed on the carriage assembly, a switch disposed on the carriage assembly, and a height scale disposed on the base assembly, wherein the material removal gauge, the switch and the height scale are on the front side of the power planer, and the hand crank is substantially on the front half of the power planer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 3 illustrates the bearing assembly used with the planer carriage assembly, whereas

FIG. 4 illustrates several components of the planer carriage assembly, whereas

FIG. 5 illustrates the feed roller bearing assembly, whereas

FIG. 7 illustrates the speed selection assembly, whereas

FIG. 10 illustrates the cutterhead assembly, whereas

DETAILED DESCRIPTION

Figure 1:
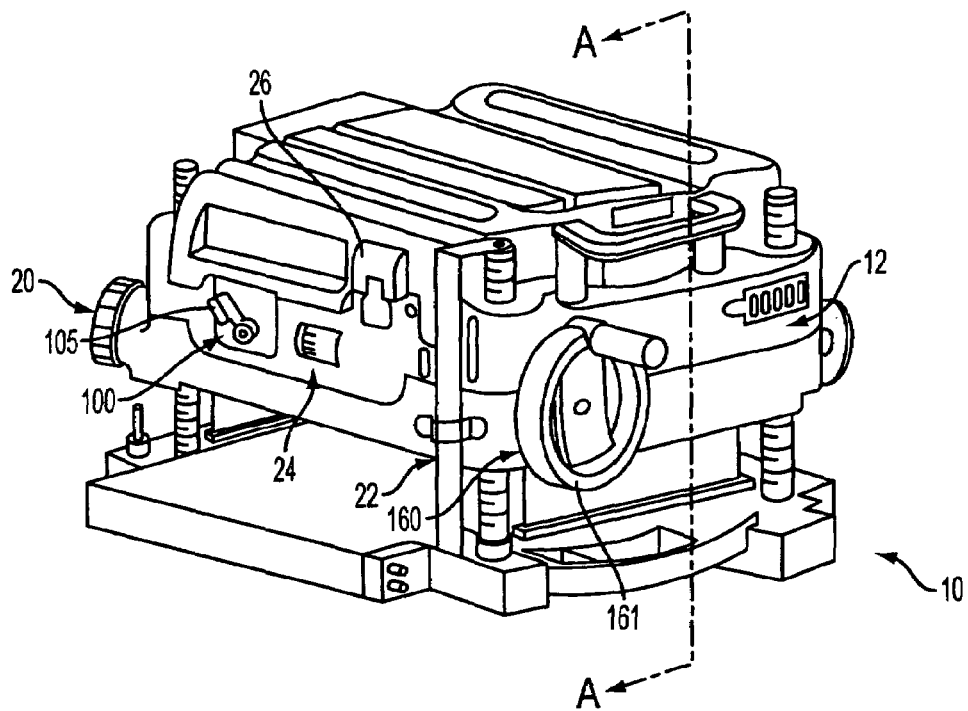
FIG. 1 is a perspective view of a portable power planer constructed in accordance with the teachings of the present invention.

With reference to FIG. 1 of the drawings, a planer mechanism constructed in accordance with the teachings of the present invention is generally indicated by reference numeral 10. The teachings of U.S. Pat. No. 6,601,621 are fully incorporated herein by reference.

The planer mechanism 10 preferably includes a planer carriage assembly 12, a base assembly 14, a planer carriage elevation mechanism 160, a carriage height setting mechanism 20, a height scale mechanism 22, a material removal gauge 24, an on/off switch 26, and a speed selection assembly 100.

As further explained below, the planer carriage elevation mechanism 160 preferably includes a hand crank 161. Preferably hand crank 161 is disposed on planer mechanism 10 so that it is substantially, if not completely, in the front half of planer mechanism 10, i.e., in front of a center plane A-A dividing the planer mechanism 10 in half.

As further explained below, the speed selection assembly 100 has a selector handle 105. Preferably selector handle 105 is disposed on the front side of planer mechanism 10. Alternatively, selector handle 105 may be disposed on planer mechanism 10 so that it is substantially, if not completely, in the front half of planer mechanism 10, i.e., in front of center plane A-A.

Persons skilled in the art will recognize that it is also advantageous to provide carriage height setting mechanism 20, height scale mechanism 22, material removal gauge 24 and/or on/off switch 26 on the front side of planer mechanism 10, in order to make such elements easily accessible to the user. Alternatively, carriage height setting mechanism 20, height scale mechanism 22, material removal gauge 24 and/or on/off switch 26 may be disposed on planer mechanism 10 so that it is substantially, if not completely, in the front half of planer mechanism 10, i.e., in front of center plane A-A.

Persons skilled in the art will also recognize that it is preferable to provide on/off switch 26 on the same side as hand crank 161.

Planer Carriage Assembly

Referring to FIGS. 1-10, the planer carriage assembly 12 preferably includes a carriage 40, a motor assembly 42 supported by carriage 40, a gearbox 44 supported by carriage 40, a first roller assembly 46 supported by carriage 40, a second roller assembly 48 supported by carriage 40 and a cutterhead assembly 50 supported by carriage 40, which will be discussed in more detail below. The carriage 40 is preferably a unitarily formed structure having a cutter pocket 54. The cutter pocket 54 is shown to include a horizontally-extending slot 62 that is formed through the top and bottom surfaces 64 and 66, respectively, of the carriage 40. The cutter pocket 54 is sized to support the cutterhead assembly 50 for rotation therein.

Figure 4A:
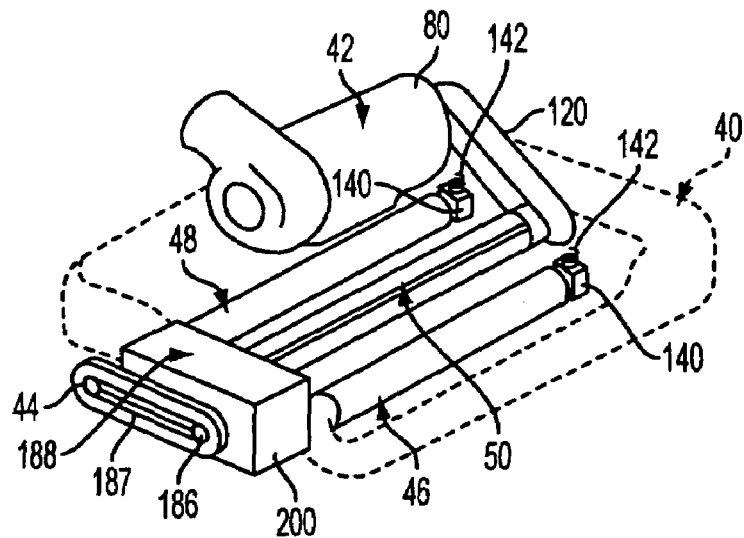
FIGS. 4A-4B are left side and right side perspective views thereof, respectively.

With additional reference to FIG. 4, the motor assembly 42 is illustrated to include a motor 80. The motor 80 is fixedly but removably coupled to the carriage 40 rearwardly of the cutter pocket 54. The motor 80 may have a shaft 81 with a pulley 82. The pulley 82 is preferably coupled to a belt 120 that is employed to transmit rotary power to the cutterhead assembly 50.

Referring to FIG. 10, cutterhead assembly 50 may a substantially elongated body 51 with a substantially triangular cross-section, a knife 53 disposed on each side of body 51, a clamp 52 sandwiching knife 53 between clamp 53 and body 51, and screws 54 for screwing clamp 52 unto body 51. Screws 54 may extend through both clamp 52 and knife 53 and threadingly engage body 51.

Distance BL defines the length of body 51. It has been found that it is critical to use at least six (and preferably seven) screws 54 for clamping knife 53 unto a body 51 having a distance BL of about 332 millimeters. Such number of screws 54 helps reduce snipe. Preferably, the distance between screws 54 is substantially equal. Such distance is distance BS. In the body 51 having the distance BL of about 332 millimeters, distance BS is preferably about 49 millimeters. Distance BE is the distance between one end of body 51 and the screw 54 closest to such end. In the body 51 having the distance BE of about 332 millimeters, distance BS is preferably about 19 millimeters.

Figure 10A:
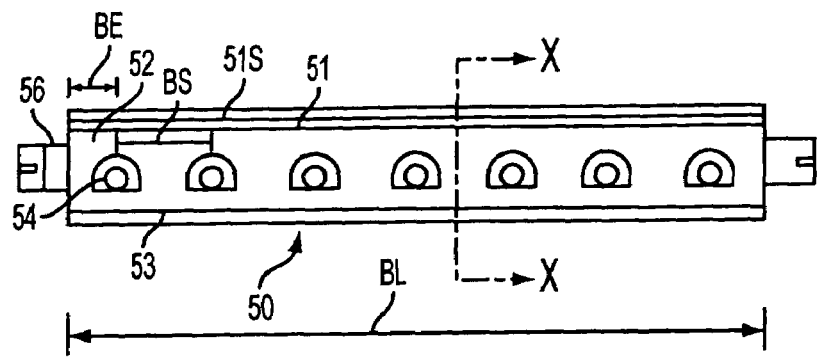
FIG. 10A is a front plan view thereof.
Figure 10B:
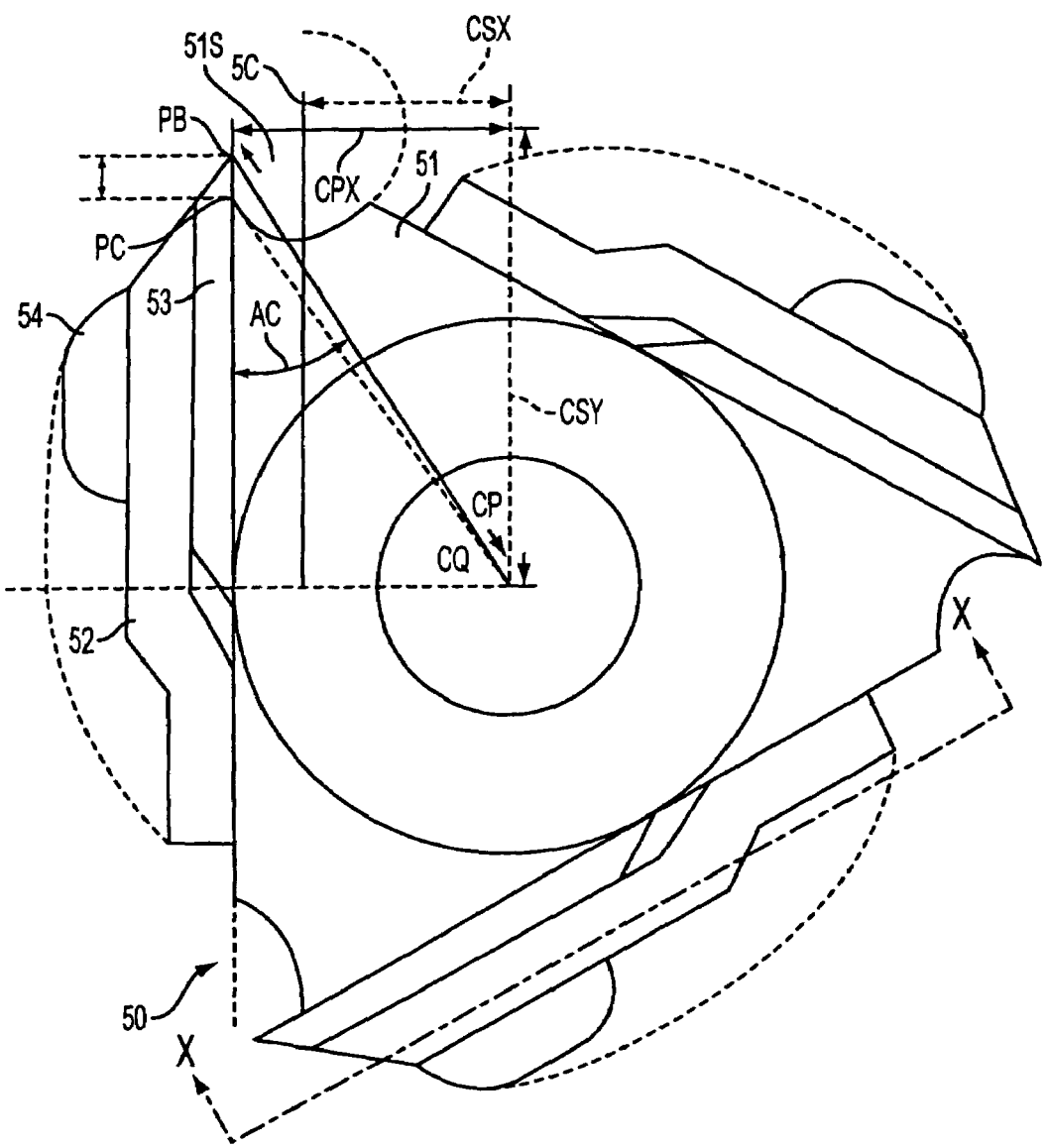
FIG. 10B is a cross-section along line X-X of FIG. 10A.

Referring to FIG. 10B, body 51 preferably has a scoop 51S. Such scoop 51S may have a center SC, with a curvature radius of about 5 millimeters. The horizontal distance CSX and vertical distance CSY between the center of body 51 and center SC are about 8.75 millimeters and about 22.26 millimeters, respectively.

Distance CP is the distance between the center of body 51 and the outermost point (point PB) of blade 53. Preferably, distance CP is the largest radius in cutterhead assembly 50. Preferably, distance CP is about 24.4 millimeters. The horizontal distance CPX between the center of body 51 and the point PB of blade 53 is about 12.5 millimeters.

Distance CQ is the distance between the center of body 51 and the point (point PC) of blade 53 where blade 53 and scoop 51S intersect. Preferably, distance CQ is about 22.7 millimeters. Distance CR is the distance between points PB, PC. Distance CR is preferably about 2 millimeters.

Angle AC is between the line between the center of body 51 and the point PB of blade 53, and the side of body 51. Angle AC is preferably about 30.82 degrees. With such arrangement, the rake angle, i.e., the angle at which blade 53 first contacts the workpiece is about 71 degrees. Such rake angle has been found critical in reducing snipe.

Figure 7A:
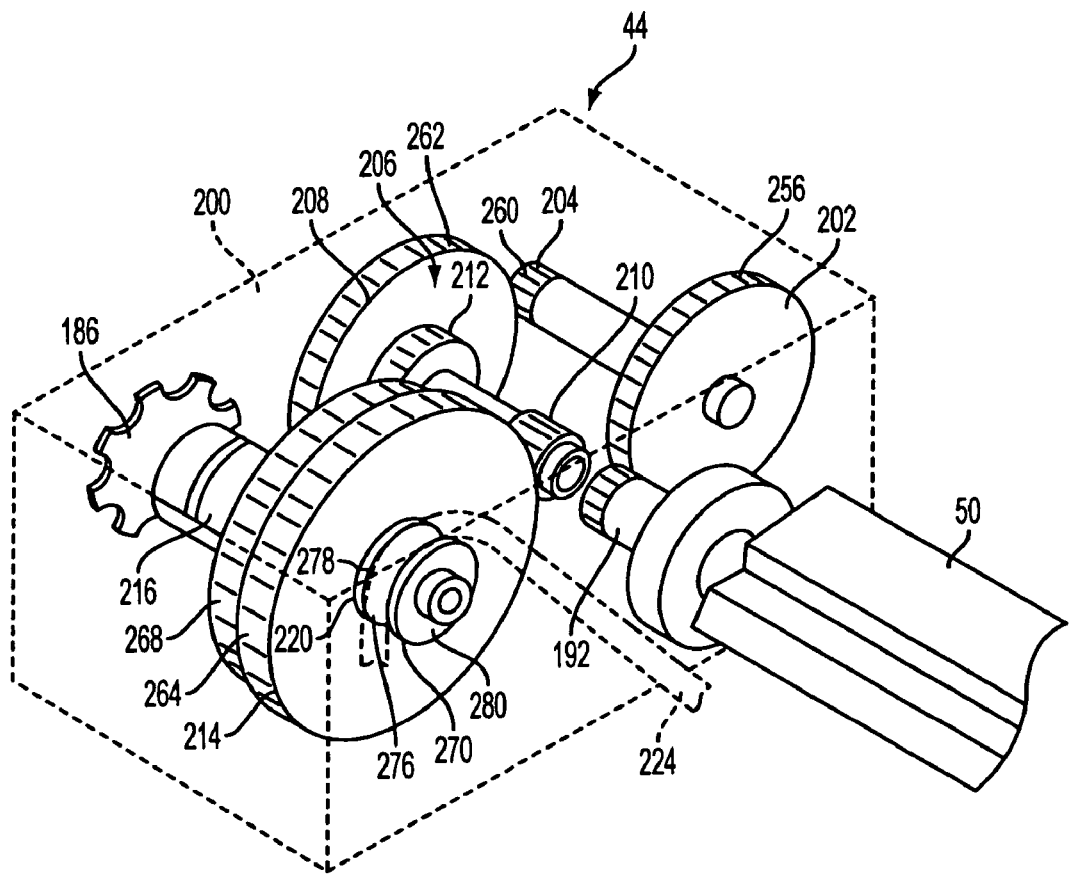
FIG. 7A is a partial perspective view thereof.

Referring to FIGS. 4 and 7, a gearbox 44 may be coupled to a side of the carriage 40 and preferably receives a rotational input from the cutterhead assembly 50. The gearbox 44 is employed to reduce the speed of the rotational input and produce a rotational output that is employed to ultimately drive the first and second roller assemblies 46, 48.

Gearbox 44 preferably includes a gearbox housing 200, an input gear 202, a first reducing gear 204, an intermediate shaft 206, a second reducing gear 208, a first intermediate reducing gear 210, a second intermediate reducing gear 212, a final reduction gear 214, an output shaft 216, and a sprocket 186 fixedly attached to output shaft 216 so that they rotate together. Preferably output shaft 216 and sprocket 186 are keyed. The gearbox housing 200 is formed from a pair of housing halves which collectively define a geartrain cavity having an input aperture, an output aperture, a selector lever aperture and a plurality of recessed shaft support bosses.

Cutterhead assembly 50 preferably has an output gear 192 that extends into the input aperture 234 in the gearbox housing 200 to provide a rotational input. The input gear 202 may be fixed to a shaft portion of the first reducing gear 204. A first pair of the shaft support bosses may journally support the first reducing gear 204 for rotation within the geartrain cavity about an axis that is parallel to the rotational axis of the output gear 192. The input gear 202 may include a plurality of gear teeth 256 which are meshingly engaged to the output gear 192.

A second pair of the shaft support bosses may journally support the intermediate shaft 206 for rotation within the geartrain cavity about an axis that is parallel to the rotational axis of the output gear 192. The second reducing gear 208, the first intermediate reducing gear 210 and the second intermediate reducing gear 212 are preferably fixed for rotation with and spaced apart along the length of the intermediate shaft 206. The teeth 260 of the first reducing gear 204 may meshingly engage with the teeth 262 of the second reducing gear 208.

The final reduction gear 214 may have a set of first gear teeth 264, a set of second gear teeth 268 having a pitch diameter that is relatively smaller than the pitch diameter of the set of first gear teeth 264, a collar portion 270 and a shaft aperture configured to engage the output shaft 216 in a slip-fit manner. The collar portion 270 preferably extends outwardly from the portion of the final reduction gear 214 on which the set of second gear teeth 268 are formed and includes an annular recess 276 that extends around its circumference and which defines a pair of opposite sidewalls 278 and 280.

The output shaft 216 may be journally supported by the output aperture and an associated shaft support boss formed into the gearbox housing 200. The distal end of the output shaft 216 preferably extends out of the gearbox housing 200 and is coupled to the sprocket 186.

A speed selector lever 224 extends from housing 200. Preferably speed selector lever 224 is supported by the speed selector lever aperture in housing 200 for linear movement along an axis coincident with the longitudinal axis of the speed selector lever 224.

A shift fork 220 may be fixedly coupled to an end of the speed selector lever 224. Shift fork 220 may include U-shaped fork portion that engages annular recess 276.

The speed selector lever 224 is employed to slide the final reduction gear 214 on the output shaft 216 between first and second positions to selectively engage the final reduction gear 214 with the first and second intermediate reducing gears 210 and 212, respectively. More specifically, the speed selector lever 224 is employed to push or pull the shift fork 220 along an axis that is parallel to the rotational axis of the output shaft 216 so that the furcations 292 of the shift fork 220 bear against the sidewalls 278 or 280 to move the final reduction gear 214 along the output shaft 216 to permit the set of first gear teeth 264 to be engaged with the teeth 294 of the first intermediate reducing gear 210 or to permit the set of second gear teeth 268 to be engaged with the teeth 296 of the second intermediate reducing gear 212. As the pitch diameter of the first intermediate reducing gear 210 is smaller than the pitch diameter of the second intermediate reducing gear 212, engagement of the final reduction gear 214 to the first intermediate reducing gear 210 will result in a rotational speed of the sprocket 186 that is relative slower as compared to the rotational speed of the sprocket 186 when the final reduction gear 214 is engaged to the second intermediate reducing gear 212.

Figure 7B:
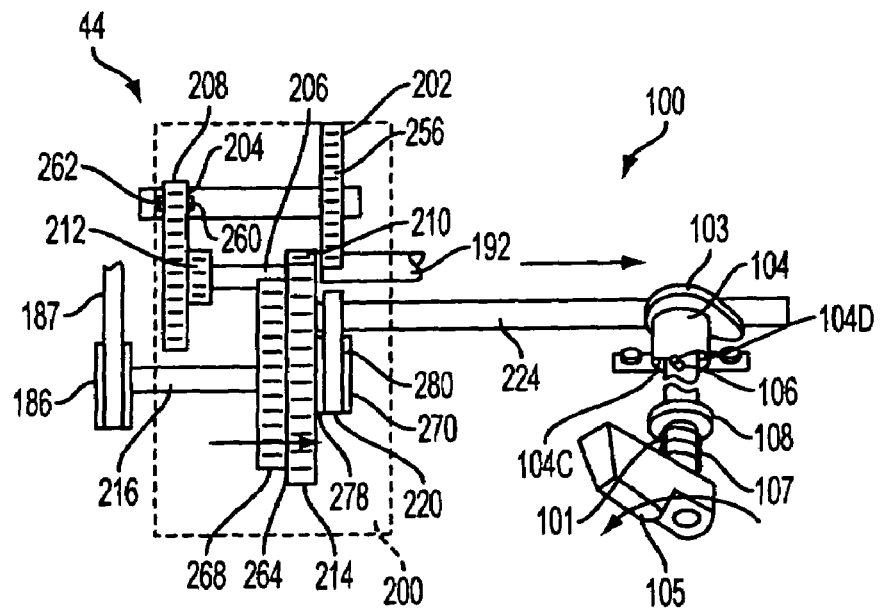
FIGS. 7B-7C show the assembly in first and second positions, respectively.
Figure 7C:
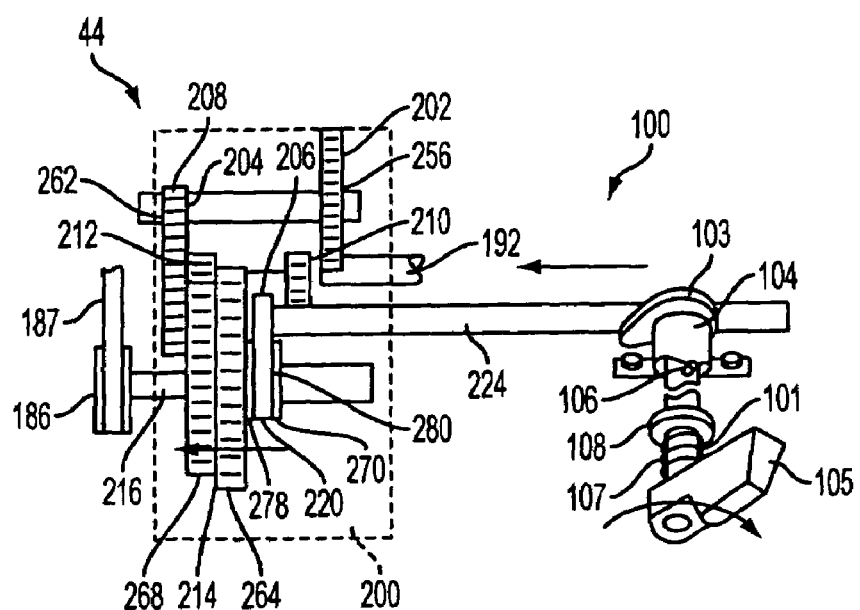

As mentioned above, it is preferable to provide a means for actuating speed selector lever 224 which is at least partly disposed on the front side of carriage 40. Such means may include speed selector handle 105. Referring to FIGS. 7B-7C, speed selector handle 105 is connected to a shaft 101, which in turn may be connected to the speed selector lever 224 via a yoke 103. Persons skilled in the art will recognize that, with such arrangement, speed selector lever 224 may be moved axially by rotating speed selector handle 105.

It is preferable to limit the number of positions to which speed selector handle 105 can rest at. Persons skilled in the art will recognize that it is advantageous to limit such number of positions to two positions, and that it is preferable to ensure that such two handle positions correspond to the first and second positions of the final reduction gear 214. This can be accomplished by providing a detent mechanism on handle 105, shaft 101 and/or carriage 40.

Alternatively, shaft 101 may extend through a cam bearing 104, which may be fixedly attached to carriage 40. Such cam bearing 104 may have a cam surface 104C which defines two depressions 104D. Shaft 101 may also have a roll pin 106 that rides along cam surface 104C. With such arrangement, the user will feel two rest positions for the speed selector handle 105. As the user moves speed selector handle 105 from one position, roll pin 106 will ride along cam surface 104C, overcoming the hump in cam surface 104C and arriving at the other position.

Shaft 101 may also have a spring 107 captured between carriage 40 and washer 108, which biases shaft 101 towards speed selector lever 224. With such arrangement, if the user attempts to leave the speed selector handle 105 between the two positions, the cam surface 104 and the spring bias will force the roll pin 106 (and thus shaft 101 and speed selector lever 224) towards one of the two defined positions.

As mentioned above, output shaft 216 drives sprocket 186. Sprocket 186 may drive a chain 187, which may be meshingly engaged to sprocket 188 (sprocket 148 in FIG. 5A) on one end of second roller assembly 48. Accordingly, second roller assembly 48 rotates when output shaft 216 rotates.

Another sprocket 189 (sprocket 148 in FIG. 5A) may be provided on the other end of second roller assembly 48. Sprocket 189 may drive a chain 190, which may be meshingly engaged to sprocket 191 (sprocket 148 in FIG. 5A) on one end of first roller assembly 46. Accordingly, first roller assembly 46 rotates when output shaft 216 rotates. Persons skilled in the art will recognize that, with such arrangement, first and second roller assemblies 46, 48 would rotate at the same speed.

Figure 8:
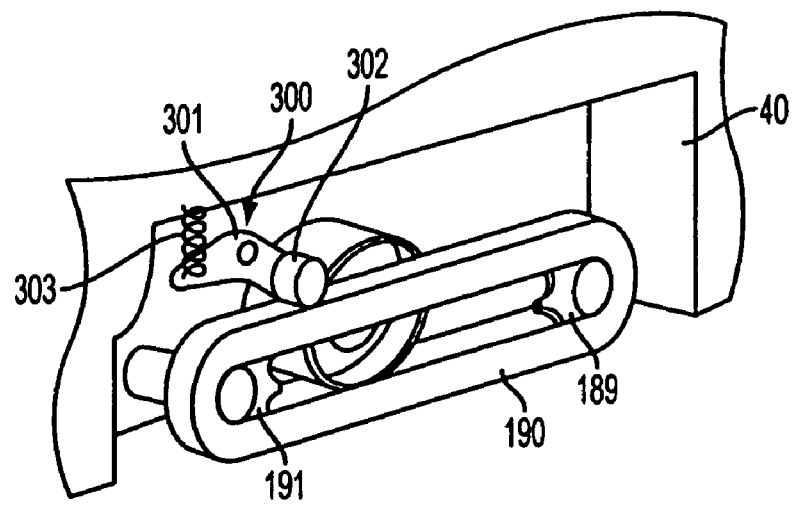
FIG. 8 is a perspective view of a first embodiment of a chain tensioner assembly.

Referring to FIG. 8, it is preferable to provide a chain tensioner mechanism 300 to maintain a constant tension on chain 190. Chain tensioner mechanism 300 may include a body 301 pivotally attached to carriage 40, a roller 302 disposed on body 301 for contacting chain 190 and a spring 303 attached to body 301 and carriage 40 for biasing roller 302 towards chain 190.

Figure 9:
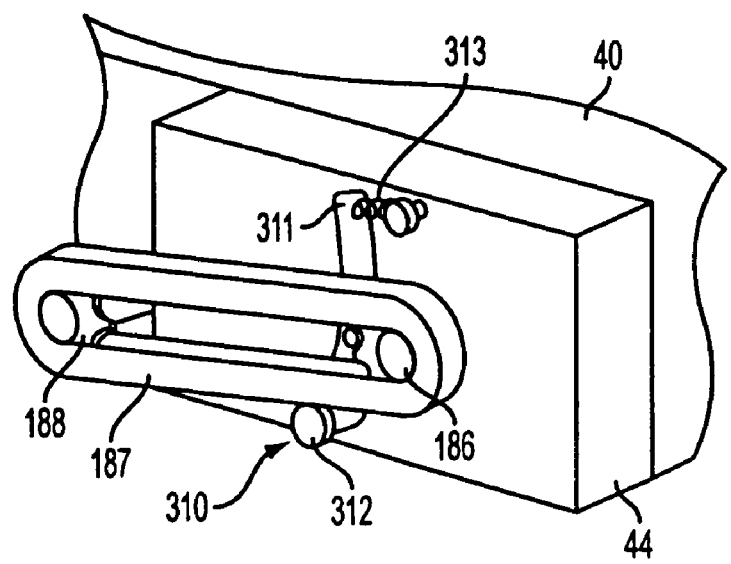
FIG. 9 is a perspective view of a second embodiment of a chain tensioner assembly.

Referring to FIG. 9, it is also preferable to provide a chain tensioner mechanism 310 to maintain a constant tension on chain 187. Chain tensioner mechanism 310 may include a body 311 pivotally attached to carriage 40 and/or gearbox 44, a roller 312 disposed on body 311 for contacting chain 187 and a spring 313 attached to body 311 and carriage 40 and/or gearbox 44 for biasing roller 312 towards chain 187.

Figure 5A:
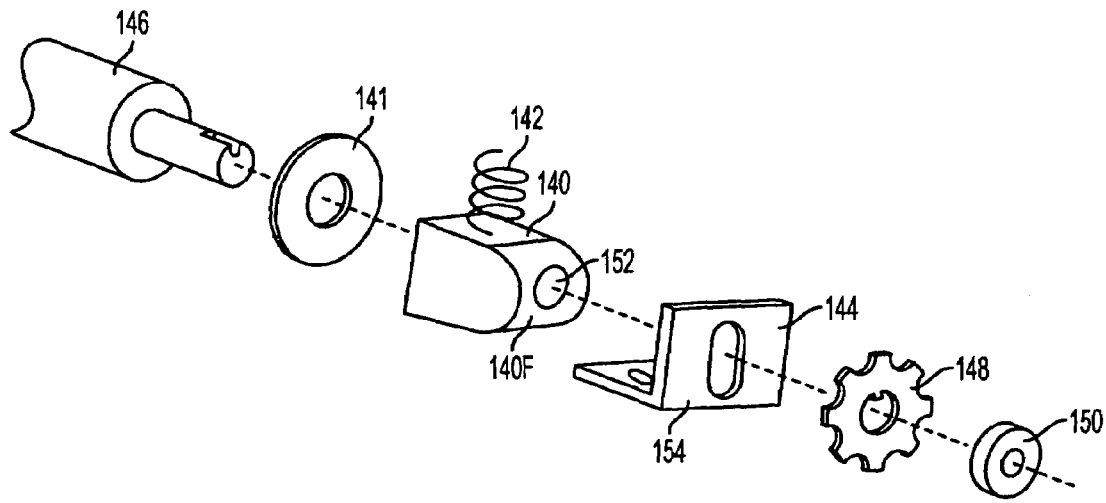
FIGS. 5A-5B are exploded perspective and side views thereof, respectively.
Figure 5B:
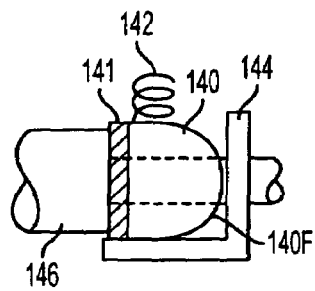

Referring to FIG. 5, each of the first and second roller assemblies 46, 48 may include a pair of washers 141, pair of bushings 140, a pair of compression springs 142, a pair of brackets 144, a roller 146, at least one sprocket 148 and a retaining ring 150. Each of the bushings 140 may have a cylindrical shaft aperture 152 and may be generally square in shape, conforming to the size of square apertures formed in the carriage 40. Bushing 140 may be made of powdered metal.

Each bracket 144 may be coupled to the bottom surface 66 of the carriage 40 and preferably limits the downward movement of the bushing 140 in the square aperture. The ears 154 on the brackets 144 likewise limit the lateral movement of the bushing 140 in the square aperture, thus ensuring that the bushing 140 does not slide outwardly past the side of the carriage 40. Because bushing 140 contacts bracket 144, it is preferable to provide a curved face 140F on bushing 140 to minimize wear on bracket 144 when bushing 140 (and thus roller 146) moves.

Figure 4B:
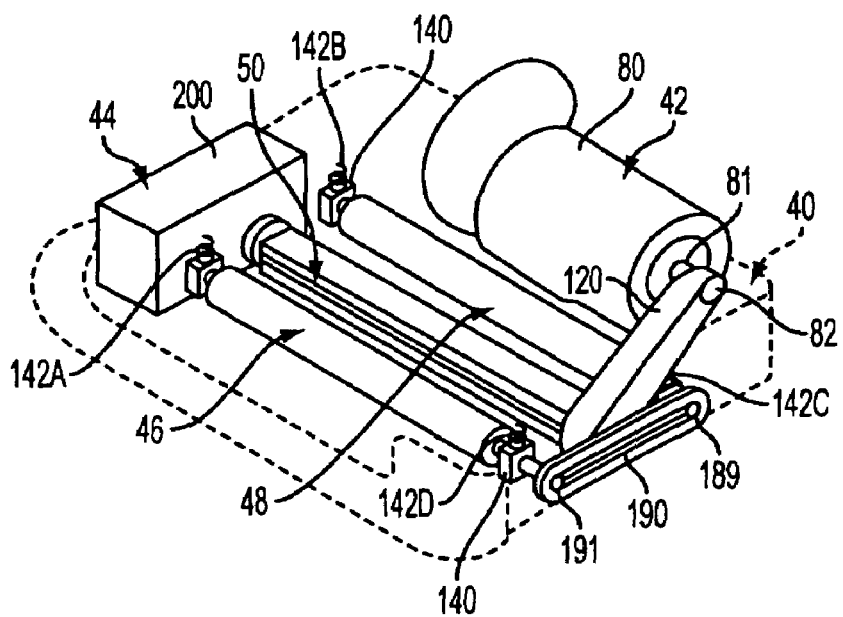

Each compression spring 142 may be disposed between the top of the bushing 140 and the bottom surface 66 of carriage 40 to exert a biasing force onto the bushing 140 which urges the bushing 140 downwardly toward the bracket 144. It is preferable that the biasing force provided by each spring 142 not be equal for all springs. FIG. 4B shows the locations of the four springs 142A, 142B, 142C, 142D. The biasing forces of springs 142A, 142B, 142C, 142D are about 5 kilograms, about 20 kilograms, about 15 kilograms, and about 5 kilograms, respectively.

It is preferable that the hardness (or softness) of rollers 146 be between about 75 Shore and about 90 Shore.

Persons skilled in the art will recognize that these elements are disposed on roller 146 as follows: washer 141 and bushing 140 are preferably disposed on one side of bracket 144, whereas sprocket 148 and retaining ring 150 are preferably disposed on the other side of bracket 144.

Persons skilled in the art will recognize that, during the operation of the planer mechanism 10, the compression springs 142 urge the bushings 140 downwardly to force the rollers 146 into contact with the workpiece. The rotational speed of the rollers 146 is equal and controlled by the gearbox 44 such that the workpiece is drawn through the planer mechanism 10 at a controlled rate. Accordingly, the speed selector lever 224 may be employed to selectively rotate the rollers 146 at one of two predetermined rotational speeds.

Figure 6:
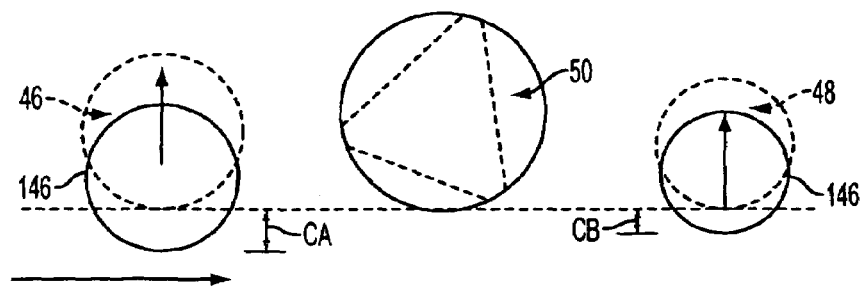
FIG. 6 schematically illustrates the positional arrangement of the feed rollers and cutterhead.

Referring to FIG. 6, it is preferable to dispose the roller 146 of first roller assembly 46 to be lower than the cutterhead assembly 50 at a rest position. The distance CA is the distance between the lowest point of the roller 146 of the first roller assembly 46 and the lowest point of cutterhead assembly 50. Distance CA is preferably about 0.8 millimeters.

Similarly, it is preferable to dispose the roller 146 of first roller assembly 48 to be lower than the cutterhead assembly 50 at a rest position. The distance CB is the distance between the lowest point of the roller 146 of the second roller assembly 48 and the lowest point of cutterhead assembly 50. Distance CB is preferably about 0.4 millimeters.

Figure 11:
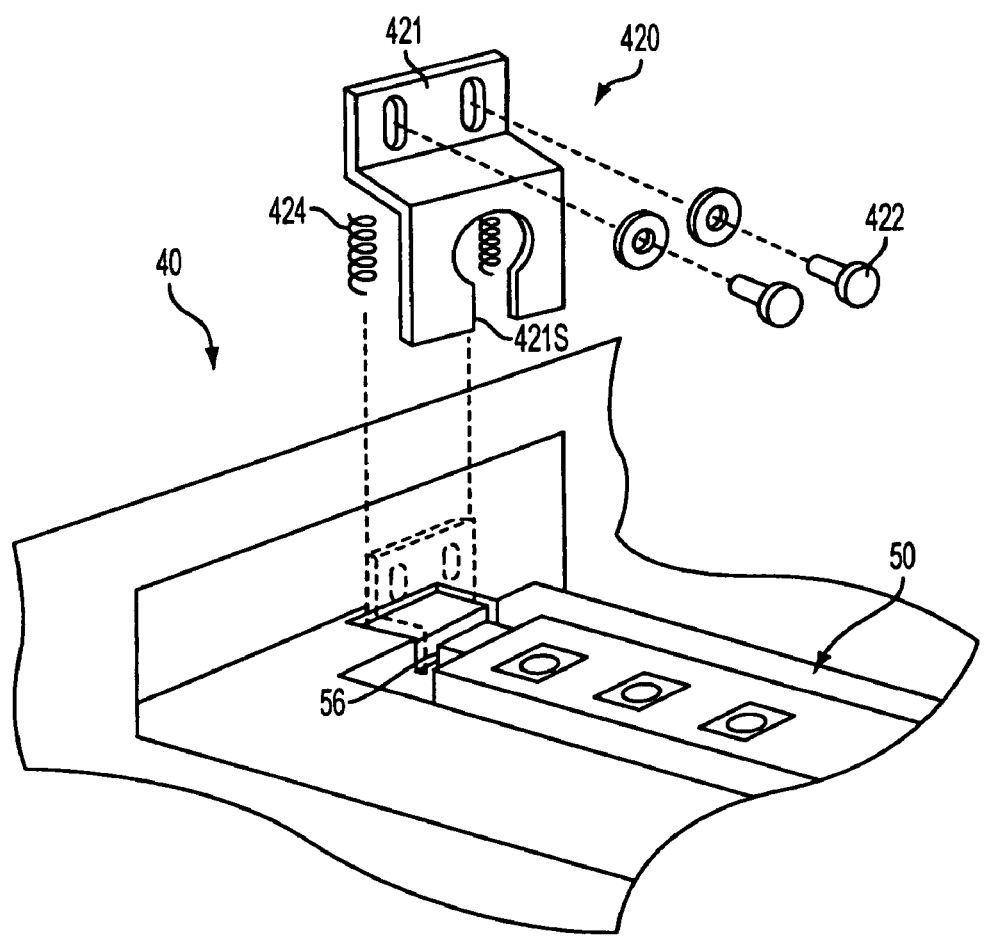
FIG. 11 is an exploded perspective view of a cutterhead locking assembly.

Referring to FIGS. 10A and 11, it is preferable to provide a cutterhead lock assembly 420 for locking the cutterhead assembly 50 in position to facilitate changing knife 53. Cutterhead lock assembly 420 may include a lock 421 which is preferably slidably attached to carriage 40 via screws 422.

Lock 421 may be moved between a unlocked position and a locking position. Lock 421 may have a surface 421S which engages a surface 56 on body 51 when lock 421 is moved towards the locking position. In the present embodiment, the user would move lock 421 downwardly to lock cutterhead 50.

Surfaces 56 may be disposed on body 51 so that surfaces 56 contact surface 421S at a predetermined position. Preferably, surface 56 contacts surface 421S at a cutterhead position where the knife 53 is substantially horizontal.

The cutterhead lock assembly 420 may also include a spring 424 for biasing lock 421 towards the unlocked position.

Planer Carriage Elevation Mechanism

Figure 2:
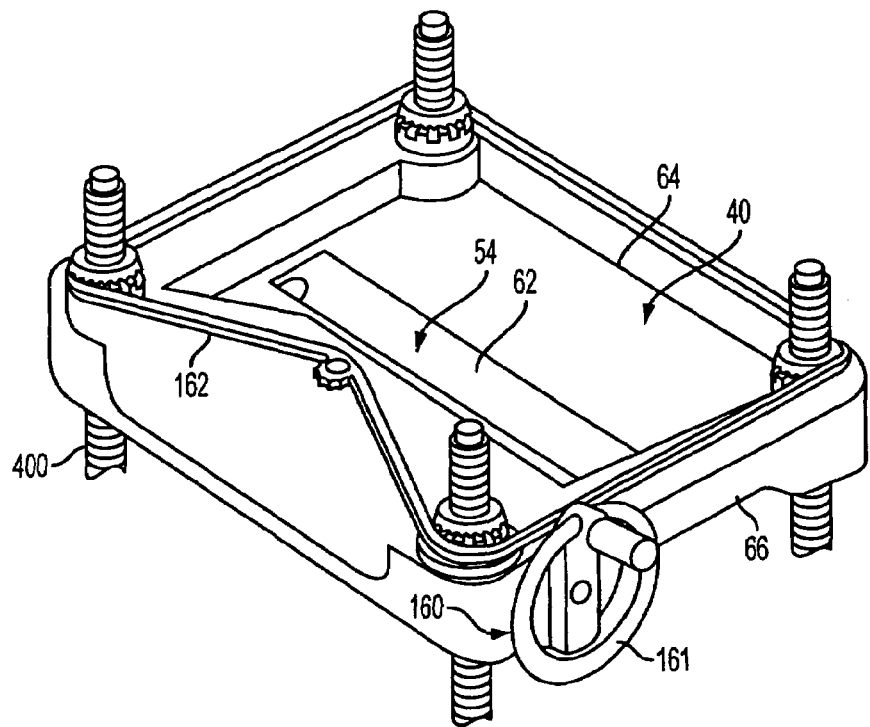
FIG. 2 is a partial perspective view of the planer carriage assembly of the portable power planer of FIG. 1.
Figure 3A:
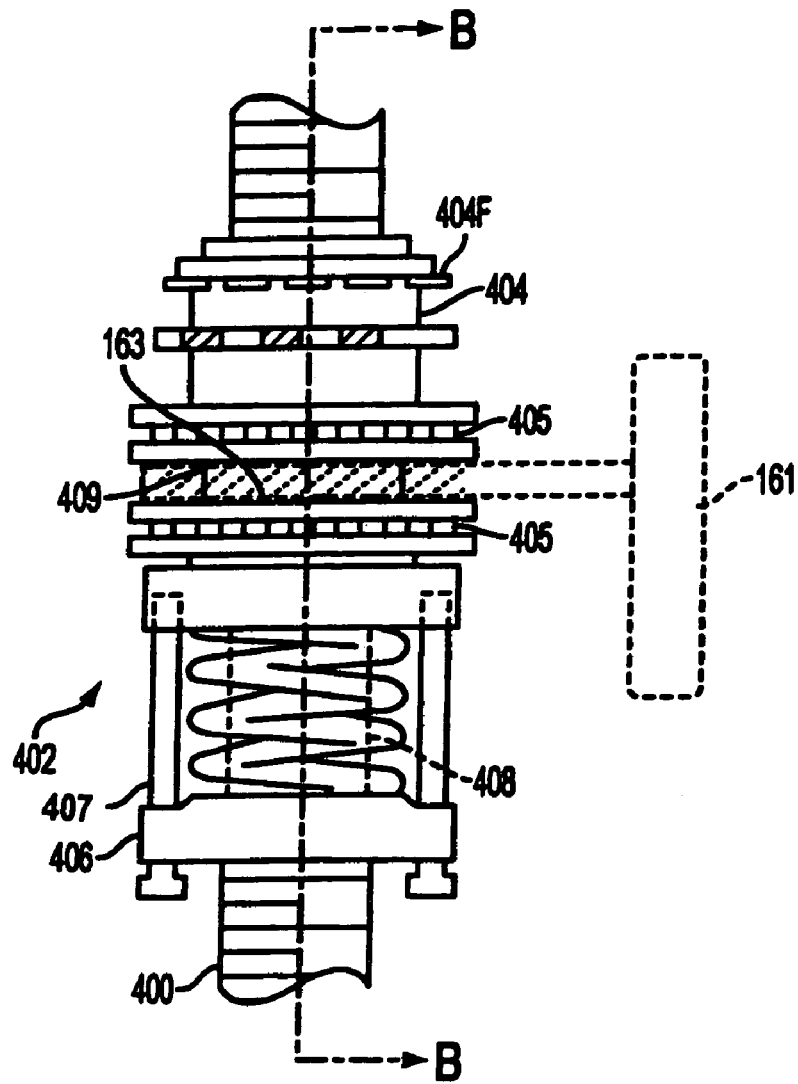
FIG. 3A is a side view of the bearing assembly.
Figure 3B:
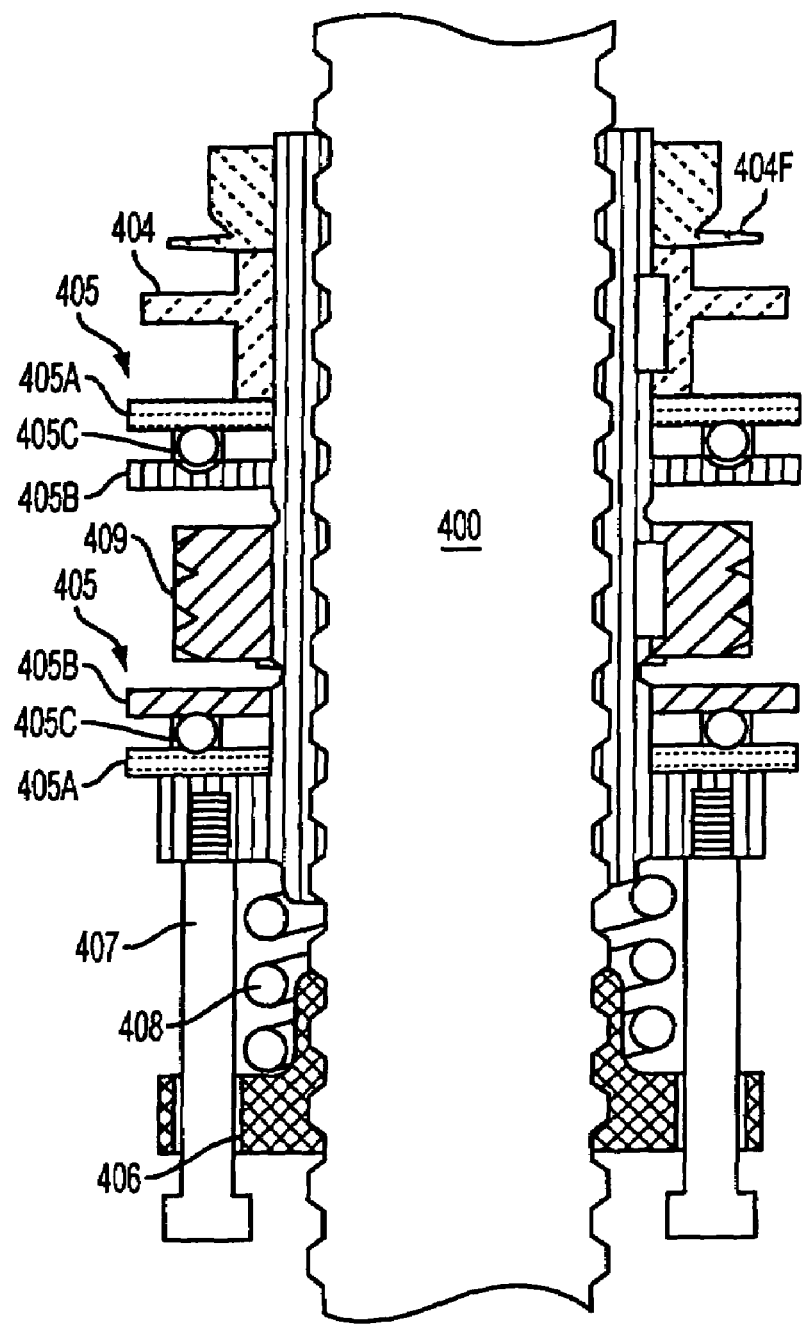
FIG. 3B is a cross-sectional view along line B-B of FIG. 3A.

In FIGS. 2-3, the planer carriage elevation mechanism 16 is shown to include a plurality of threaded guide posts 400, a plurality of nut assemblies 402 and an adjustment mechanism 160, which includes hand crank 161 and chain 162, which engages all nut assemblies 402.

Each nut assembly 402 includes a main body 403, which is threadingly engaged to guide post 400, a sprocket 404 axially fixed to main body 403 for meshing with chain 162, and thrust bearings 405 disposed between main body 403 and carriage 40 for allowing main body 403 to rotate relative to carriage 40. Preferably, a first part 405A of thrust bearings 405 is attached to carriage 40, a second part 405B is attached to main body 403, and a movable element 405C, such as a ball or cylinder bearing, is disposed between first and second parts 405A, 405B to enhance rotational movement. Persons skilled in the art will recognize that such thrust bearings 405 are especially desirable in this application as they minimize or eliminate vertical play.

Sprocket 404 may have a flange 404F to prevent chain 162 from unmeshing therewith.

Each nut assembly 402 may a lower plate 406 which threadingly engages guide post 400. Lower plate 406 may receive screws 407 therethrough, which in turn are threadingly engaged to main body 403. Persons skilled in the art will recognize that lower plate 406 is not fixedly attached to screws 407. Instead, lower plate 406 can slide along screws 407. A spring 408 is disposed between main body 403 and lower plate 406 to bias lower plate 406 towards the heads of screws 407. Preferably spring 408 provides a separation force of about 15 kilograms. With such arrangement, backlash is minimized or eliminated. This helps in reducing or eliminating snipe.

Persons skilled in the art will also recognize that, since spring 408 is biasing lower plate 406 against the threads of guide post 400, main body 403 cannot rotate until the frictional force between lower plate 406 and guide post 400 is overcomed This in effect constitutes a locking mechanism for locking carriage 40 in a desired position.

One of the nut assemblies 402 may have a worm gear 409 fixedly attached to the main body 403. Worm gear 409 may meshingly engage a gear 163 driven by hand crank 161. Accordingly, as hand crank 161 is rotated, gears 163, 409 cause main body 403 to rotate, which in turn causes sprocket 404 to rotate therewith. As sprocket 404 rotates, chain 162 moves therealong, causing the other nut assemblies 402 to rotate therewith, changing the elevation of carriage 40.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A power planer for planing a top surface of a workpiece comprising:
    a base assembly;
    a carriage assembly disposed above the base assembly and operably connected to the base assembly, the carriage assembly comprising a cutterhead assembly, the carriage assembly being vertically movable to change distance between the base assembly and the carriage assembly;
    a hand crank attached to the carriage assembly for changing the distance between the base assembly and the carriage assembly, the hand crank being vertically movable with the carriage assembly;
    a material removal gauge disposed on the carriage assembly; a switch disposed on the carriage assembly;

a speed selector handle disposed on the carriage assembly for adjusting the speed of rotation of the cutterhead assembly; and a height scale disposed on the base assembly;

wherein the material removal gauge, the switch, and the speed selector handle, and the height scale are on the front side of the power planer and wherein the speed selector handle can be rotated between at least two positions.

2. The power planer of claim 1, wherein the switch and the hand crank are on the same side half.

3. The power planer of claim 1, further comprising a carriage height mechanism disposed on the carriage assembly, and disposed on the front half of the power planer.

4. The power planer of claim 1, wherein the cutterhead assembly is coupled to a transmission, a first roller assembly is drivingly connected to the transmission, and a second roller assembly is drivingly connected to the first roller assembly.

5. The power planer of claim 4, wherein the first roller assembly is drivingly connected to the transmission via a chain.

6. The power planer of claim 5, further comprising a chain tensioner mechanism disposed on the carriage assembly for maintaining substantially constant tension on the chain.

7. The power planer of claim 4, wherein the second roller assembly is drivingly connected to the first roller assembly via a chain.

8. The power planer of claim 7, further comprising a chain tensioner mechanism disposed on the carriage assembly for maintaining substantially constant tension on the chain.

9. The power planer of claim 1, further comprising a first roller assembly drivingly connected to the cutterhead, first and second springs disposed between the carriage assembly and the first roller assembly, a second roller assembly drivingly connected to the first roller assembly, third and fourth springs disposed between the carriage assembly and the first roller assembly, wherein the first and third springs provide unequal forces.

10. The power planer of claim 1, wherein a first roller assembly is drivingly connected to the cutterhead and a second roller assembly is drivingly connected to the first roller assembly, and wherein the first roller assembly is lower than the cutterhead assembly.

11. The power planer of claim 10, wherein the second roller assembly is lower than the cutterhead assembly.

12. The power planer of claim 10, wherein the first roller assembly is lower than the second roller assembly.

13. A power planer for planing a top surface of a workpiece comprising:

a base assembly including at least one guide post;

a carriage assembly disposed above the base assembly and threadingly engaging the at least one guide post, the carriage assembly comprising at least one nut assembly threadingly engaging the corresponding at least one guide post, a motor, and a cutterhead assembly driven by the motor, the carriage assembly being vertically movable to change distance between the base assembly and the carriage assembly;

a hand crank attached to the carriage assembly for changing the distance between the base assembly and the carriage assembly;

a material removal gauge disposed on the carriage assembly;

a switch disposed on the carriage assembly; and a height scale disposed on the base assembly;

wherein the at least one nut assembly comprises a main body threadingly engaging the corresponding at least one guide post, a lower plate threadingly engaging the corresponding at least one guide post, at least one screw extending through the lower plate and threadingly engaging the main body, and a spring disposed between the main body and the lower plate.

14. The power planer of claim 13, further comprising a thrust bearing disposed on the main body.

\* \* \* \* \*